United States Patent [19]

Langen et al.

[11] 4,430,030
[45] Feb. 7, 1984

[54] OPERATING PROCESS FOR THE FORMATION OF A STEADY PARTICLE STREAM OF PARTICLES CONVEYED WITHIN A FLOW CONDUIT BY A FLOW MEDIUM AND ARRANGEMENT FOR EFFECTUATION OF THE PROCESS

[75] Inventors: Hans Langen, Jülich; Helmut Ringel, Niederzier-Hambach, both of Fed. Rep. of Germany

[73] Assignee: Kernforschungsanlage Jülich GmbH, Fed. Rep. of Germany

[21] Appl. No.: 173,332

[22] Filed: Jul. 29, 1980

[30] Foreign Application Priority Data

Aug. 1, 1979 [DE] Fed. Rep. of Germany ....... 2931244

[51] Int. Cl.³ .............................................. B65G 53/40
[52] U.S. Cl. .................................. 406/146; 406/122; 406/191; 406/136
[58] Field of Search ................. 406/78, 106, 122, 124, 406/127, 128, 130, 144, 146, 191, 192, 136

[56] References Cited

U.S. PATENT DOCUMENTS 2,955,877 10/1960 Ecal .................................. 406/144 X
3,504,945 4/1970 Leibundgut et al. ................ 406/144
3,606,476 9/1971 Krueger et al. ................ 406/106 X

OTHER PUBLICATIONS

Transactions of the American Nuclear Society; 1977 Winter Meeting; pp. 292-293.

Primary Examiner—Jeffrey V. Nase
Attorney, Agent, or Firm—Scully, Scott, Murphy & Presser

[57] ABSTRACT

An operating process for the formation of a steady particle stream of particles which are conveyed within a flow conduit through the intermediary of a flow medium, and which are introduced into the medium flow under the effect of gravity through an infeed conduit discharging into the flow conduit. The invention also includes an arrangement for the effectuation of the process. A partial flow of the flow medium from the flow conduit is introduced into the infeed conduit in a direction counter to the flow direction of the particles, and is regulated in the manner so as to set the desired particle flow. The volumetric flow of the flow medium which streams counter to the particles in the infeed conduit can, in an advantageous manner, be regulated externally of the infeed conduit whereby no regulating devices will be located in the flow path of the particles.

3 Claims, 1 Drawing Figure

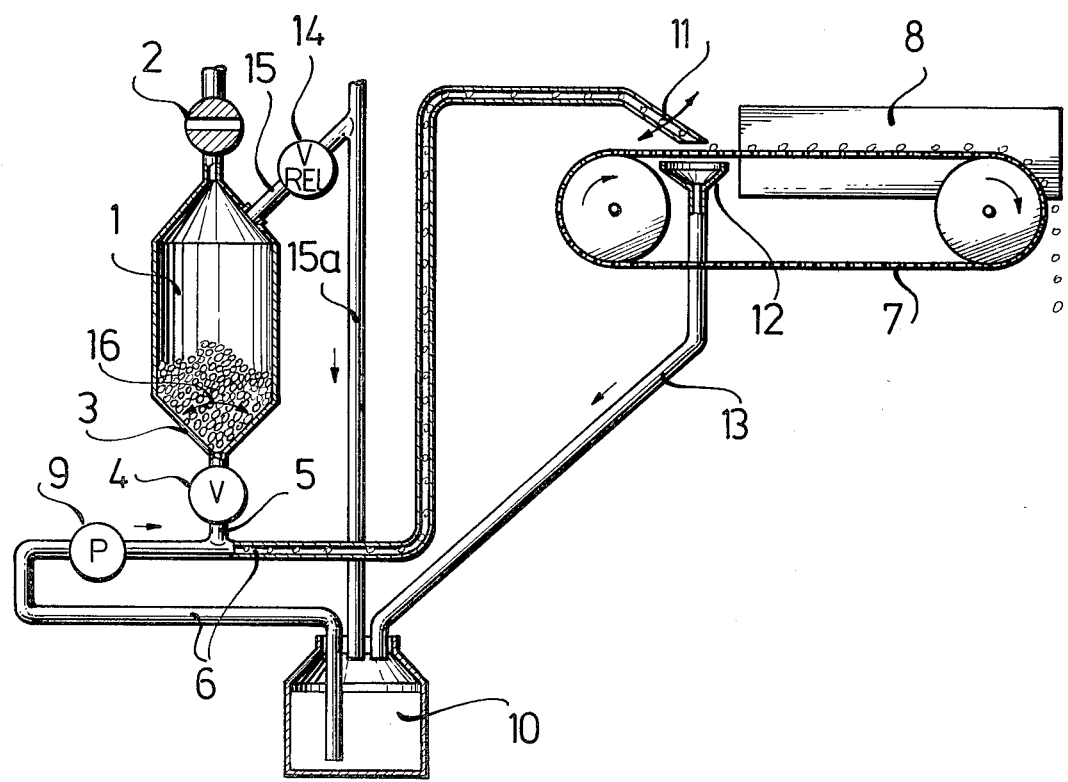

OPERATING PROCESS FOR THE FORMATION OF A STEADY PARTICLE STREAM OF PARTICLES CONVEYED WITHIN A FLOW CONDUIT BY A FLOW MEDIUM AND ARRANGEMENT FOR EFFECTUATION OF THE PROCESS

BACKGROUND OF THE INVENTION

1. Field of the Invention

The present invention relates to an operating process for the formation of a steady particle stream of particles which are conveyed within a flow conduit through the intermediary of a flow medium, and which are introduced into the medium flow under the effect of gravity through an infeed conduit discharging into the flow conduit; as well as to an arrangement for the effectuation of the process.

2. Discussion of the Prior Art

The conveyance of particles through the intermediary of a flow medium is known. For solid particles there are utilized gaseous or liquid flow media. For example, in the production of ceramic nuclear fuel particles, the gel particles which are produced from hydrobrine or aqueous salt solutions containing the nuclear fuels, are applied through trickling onto a drying web by means of wash water as the flow medium, having reference to "Transactions of the American Nuclear Society", 1977, Vol. 27, pgs. 292–293. Serving for the application of the gel particles is a particle discharge member which is pivotable transversely relative to the drying web, having reference to Berichte der Kerforschungsanlage Jülich, Jül-1258, 1975, pg. 116. In order to achieve a quality of nuclear fuel particles which is adequate to the demands set thereon, it is necessary that the particle deposition on the drying web be rendered uniform. Aimed for is a separation of the particles on the drying web or a definite multi-layered particle deposition. In order to achieve the foregoing it is necessary that the particle stream in the flow conduit be correlated over each unit of time with the drying web surface which is to be covered with the particles.

It is also known that the particle flow can be regulated through the interposition of a shut off device in the infeed conduit. Nevertheless, particularly during the starting up of the apparatus as well as at a low fill level of the particle supply container, is it impossible to avoid disruptions in the particle stream. Discontinuities will also be encountered in that gas bubbles in the flow medium lead to the formation of larger gas bubbles in the region of the shut off device, as well as at the discharge of the infeed conduit into the flow conduit, which can disrupt or even completely block the particle passage. The added introduction of flow medium into the particle supply container and the setting of an excess pressure with respect to the pressure reigning in the flow conduit cannot eliminate the encountered disruptions in a satisfactory manner.

SUMMARY OF THE INVENTION

Accordingly, it is an object of the present invention to form a steady particle stream within a flow conduit which conveys the particles through the employment of a flow medium, and which will not evidence any deviations either during the starting up phase, nor during refilling or in any other manner in dependence upon the extent of the filling of the particle supply container. Moreover, any gas bubbles which may be formed in the liquid flow medium will not lead to discontinuities in the particle stream. Concurrently, it should be possible to regulate the particle stream in a simple manner.

The foregoing object is achieved in a process of the above-mentioned type in that a partial flow of the flow medium from the flow conduit is introduced into the infeed conduit in a direction counter to the flow direction of the particles, and is regulated in the manner so as to set the desired particle flow. The volumetric flow of the flow medium which streams counter to the particles in the infeed conduit can, in an advantageous manner, be regulated externally of the infeed conduit whereby no regulating devices will be located in the flow path of the particles. Preferably, the partial flow is adjusted in a flow region which is devoid of particles. The lower there is set the volumetric flow of the flow medium in the infeed conduit, the larger is the quantity of particles which will enter the flow conduit.

BRIEF DESCRIPTION OF THE DRAWING

Reference may now be had to a preferred embodiment of the present invention, wherein the single FIGURE of the accompanying drawing schematically illustrates an arrangement for the effectuation of the inventive operating process.

DETAILED DESCRIPTION

Advantageous embodiments of the arrangement are also set forth hereinbelow in Examples 1 and 2.

In the arrangement which is illustrated in the accompanying drawing, gel particles which are constituted of nuclear fuel are stored in a particle supply container 1. The supply container 1 is filled with wash liquid and is charged with gel particles through a filling member 2, in the exemplary embodiment a ball valve is employed for this purpose. The gel particles collect in a base incline formed in the bottom 3 of the supply container and, after the opening of a shut off valve 4, are charged under the influence of gravity through an infeed conduit 5 into a flow conduit 6. Within the flow conduit the particles are conducted through the intermediary of a flow medium towards a drying web 7 of a dryer 8. A flow pump 9 for the flow medium is located upstream of the discharge location of the infeed conduit into the flow conduit, which, for instance, may be a gear pump which aspirates the flow medium from a reservoir 10 into the flow conduit 6. In this embodiment, wash water is employed as the flow medium. A particle discharge element 11 of the flow conduit 6 is arranged so as to be pivotable above the drying web 7 so that the particles which exit from the flow conduit can be applied over the entire width of the drying web 7 which is provided therefor. The drying web 7 consists of wire netting, through the mesh openings of which the flow medium will flow off into a receiving funnel 12. A pipe conduit 13 provides for the reconveyance of the flow medium into the reservoir 10.

The particle quantity which is to be deposited on the drying web 7 can be adjusted through a regulating valve 14 which is arranged in a return conduit 15 for a partial flow of the flow medium between the particle supply container 1 and the reservoir 10. In order to preclude the entry of particles into the return conduit 15, in the illustrative embodiment the return conduit 15 is connected to the particle supply container 1 above the gel particles which are stored in the wash liquid. Additionally, a filter is provided at the connecting location so as to preclude any entry of gel particles from the supply container 1 into the return conduit 15.

When the regulating valve 14 is opened, with an open shut off valve 4, flow medium will stream out of the flow conduit 6 into the infeed conduit 5 in a direction counter to that of the particle flow. By regulating the partial flow of the flow medium into the infeed conduit there will be adjusted the particle stream. This is effected with the aid of the regulating valve 14, without influencing the unhindered particle flow in the infeed conduit 5. The more intense there is set the volumetric flow of the flow medium, the lesser becomes the particle flow. The particles which are charged into the flow conduit can thus be separated and, in a single-layer, deposited at spacings relative to each other on the drying web. The formation of larger gas bubbles in the infeed conduit 5 is prevented through the conductance of the stream of the partial flow into the infeed conduit. In order to also prevent the formation of gas bubbles in the region of the regulating valve 14, the return conduit 15 is arranged slightly upwardly inclined upstream and downstream of the regulating valve and discharges into an upwardly open outlet. In the illustrated embodiment, the return conduit 15 forms downstream of the regulating valve 14 an upwardly-opening gravity-feed conduit 15a which discharges into the reservoir 10. The flow medium which streams out of the particle supply container 1 through the regulating valve 14 is thus reconveyed into the reservoir 10, without the flow medium which streams off in the gravity-feed conduit influencing the regulation through any aspirating effect.

EXEMPLARY EMBODIMENT 1

Treated in the arrangement are $ThO_2$-gel particles each having a diameter of 1.33 mm and a density of the gel substance of 1.72 g/cm$^3$. The particle supply container 1 has a diameter of 15 cm and a height of 30 cm. Ball valves or spherical shuttlecocks of 12 mm in size are utilized as filler element 2 and the shutoff valve 4. The bottom 3 of the particle supply container 1 is conically downwardly sloped towards the infeed conduit 5. It has been demonstrated that the diameter of the infeed conduit 5 and the cone angle 16 of the bottom, in dependence upon the particle size, influence the formation of a steady particle stream. The diameter of the infeed conduit is preferably eight times as large as the largest particle diameter; in the exemplary embodiment the infeed conduit has a diameter of 12 mm. In this manner there is avoided the undesired abrasion of the particles. For $ThO_2$ gel particles which have a diameter of 1.33 mm, a 90° cone angle for the bottom 3 of the particles supply container has been found to be most satisfactory for an uninterrupted operation. The angle of coincity is measured so that there is afforded the movement of the particles towards the discharge of the particle supply container.

The gel particles are deposited individually and in a single layer onto the drying web 7, which has a width of 200 mm and which travels through the dryer 8 at a web speed of 200 mm/min. At a frequency for the particle discharge 11 of 30 back-and-forth movements each minute, through the regulating valve 14 there is then set a particle stream of 380 particles each second for the loading of the drying web.

EXEMPLARY EMBODIMENT 2

$UO_3$-gel particles each of 0.7 mm in diameter are dried. At this size of the particles a cone angle of 50° was found to be most satisfactory for the configuration of the bottom of the particle supply container. The diameter of the infeed conduit as in the previous example, consisted of a size of 12 mm.

In order to apply a single-layered particle coating on the drying web, with a web width, web speed, and frequency of the particle discharge remaining unchanged from that in Example 1, a particle stream of 1360 particles each second was set by means of the regulating valve 14.

The regulation of the particle stream could also be achieved for other values without difficulty. A change in the filling level of the particle supply container 1 produced no disruptions of any kind in the continuous particle flow.

What is claimed is:

1. In an operating process for the formation of a steady particle stream of particles which are conveyed within a flow conduit through the intermediary of a flow medium, said particles being introduced into said flow medium under the effect of gravity through an infeed conduit discharging into said flow conduit; the improvement comprising: regulating a partial flow quantity of the flow medium introduceable into the infeed conduit from a supply container by withdrawing said partial flow quantity from said infeed conduit in a direction counter to the flow direction of the particles in a flow region devoid of particles for the setting of the particle stream to be introduced into said flow conduit; venting any gas bubbles formed in said flow medium upstream of said infeed conduit to occlude the entry of gas bubbles into the infeed conduit which would adversely affect the flow of the particles stream in the flow conduit; reconveying said partial flow into said supply container for said flow medium after separation of said particles, said partial flow being regulated in a return conduit leading to said container; and venting gas bubbles entrained in the flow medium through an upwardly open outlet in said return conduit.

2. In an arrangement for the formation of a steady particle stream of particles which are conveyed within a flow conduit through the intermediary of a flow medium; an infeed conduit connected to said flow conduit and introducing said particles into said flow medium under the effect of gravity from said infeed conduit to said flow conduit; a particle supply container for said particles; an inlet element interconnecting said infeed conduit and said container to facilitate conveyance of said particles from said supply container into said infeed conduit under the effect of gravity; a return flow conduit for a partial flow of said flow medium devoid of particles being connected to said particle supply container; and a flow regulating valve being arranged in said return flow conduit; the improvement comprising: an upwardly open outlet in said return conduit in said return conduit for venting gas bubbles entrained in the flow medium; said infeed conduit having a diameter at the connection to said particle supply container dimensioned at least eight times as large as the largest particle diameter, said particle supply container having a conically-shaped inclined bottom, said infeed conduit being connected between the bottom of said container and said flow conduit, said container bottom having an angle of conicity designed in conformance with the diameter of the particles stored in said supply container whereby particles of larger diameters require the utilization of a container bottom having a greater angle of conicity.

3. In an arrangement for the formation of a steady particle stream of particles which are conveyed within a flow conduit through the intermediary of a flow medium; an infeed conduit connected to said flow conduit and introducing said particles into said flow medium under the effect of gravity from said infeed conduit to said flow conduit; a particle supply container for said particles; in inlet element interconnecting said infeed conduit and said container to facilitate conveyance of said particles from said supply container into said infeed conduit under the effect of gravity; a return flow conduit for a partial flow of said flow medium devoid of particles being connected to said particle supply container; and a flow regulating valve being arranged in said return flow conduit; the improvement comprising: said return flow conduit being upwardly inclined upstream and downstream of said flow regulating valve and discharging into an upwardly open outlet facilitating flow of flow medium from said return conduit into a reservoir for said flow medium and concurrently allowing for venting of gas bubbles entrained in said flow medium through said outlet.

* * * * *